(12) United States Patent
Birnbaum et al.

(10) Patent No.: US 7,996,518 B2
(45) Date of Patent: Aug. 9, 2011

(54) DETECTING MACHINE UTILIZATION ACTIVITY

(75) Inventors: Aaron R. Birnbaum, Brier, WA (US); Dipak Boyed, Bellevue, WA (US); Michael Robinson, Bellevue, WA (US); Jared W. Wilson, Redmond, WA (US); Charles McClintock, Kirkland, WA (US); Carlo Rivera, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 458 days.

(21) Appl. No.: 11/623,743

(22) Filed: Apr. 13, 2007

(65) Prior Publication Data

US 2008/0256229 A1 Oct. 16, 2008

(51) Int. Cl.
*G06F 15/173* (2006.01)
(52) U.S. Cl. ......... 709/224; 709/220; 709/223; 717/127
(58) Field of Classification Search ........... 709/223–226
See application file for complete search history.

(56) References Cited

U.S. PATENT DOCUMENTS

| | | | |
|---|---|---|---|
| 5,964,839 A * | 10/1999 | Johnson et al. | 709/224 |
| 6,691,067 B1 | 2/2004 | Ding et al. | 702/186 |
| 6,845,456 B1 | 1/2005 | Menezes et al. | 713/320 |
| 6,978,303 B1 | 12/2005 | McCressh et al. | 709/224 |
| 7,058,824 B2 | 6/2006 | Plante et al. | 713/300 |
| 7,072,793 B2 | 7/2006 | Lehman | 702/178 |
| 2003/0225877 A1 * | 12/2003 | Packman et al. | 709/224 |
| 2006/0010101 A1 | 1/2006 | Suzuki et al. | 707/2 |
| 2006/0037024 A1 | 2/2006 | Bodas | 718/105 |
| 2006/0136504 A1 | 6/2006 | Babutzka et al. | 707/201 |
| 2006/0236324 A1 | 10/2006 | Gissel et al. | 718/105 |

FOREIGN PATENT DOCUMENTS

EP 0938036 A2 8/1999

OTHER PUBLICATIONS

Svobodova, Liba, "Measuring Computer System Utilization With A Hardware and a Hybrid Monitor," Project Info, Stanford University. http://portal.acm.org'citation.cfm?id=1113650.1113652.

* cited by examiner

*Primary Examiner* — Ian N Moore
*Assistant Examiner* — Jackie Zuniga
(74) *Attorney, Agent, or Firm* — Merchant & Gould

(57) ABSTRACT

Detecting machine utilization activity may be provided. Client machine activity within a computer network may be monitored to determine if the client machine is available for use, or if the computer is already engaged in one or more activities. During a predetermined receive period, machine activity information for a given client machine. The machine activity information for the client machine is compared to previously stored machine activity information to determine if an activity state for the client machine has changed. If the activity state of the client machine has changed, the activity state for the machine is updated. Machine activity information for all computers in the computer network may be used to track and optimize resources with the computer network.

11 Claims, 5 Drawing Sheets

200

| Unknown/Unused | Maintenance Mode | Offline |
| --- | --- | --- |
| Dead | Available/Online | ExclusiveUse/Online |
| Paused/Online | Dispatched/Online | Configuring/Online |
| SharedUse/Online | Querying/Online | Available/Rebooting |
| ExclusiveUse/Rebooting | Configuring/Rebooting | SharedUse/Rebooting |
| Querying/Rebooting | Reserved/Idle | Reserved/In Use |
| Available(Manual Use)/Online | Priming/Online | Priming/Rebooting |

*FIG. 2*

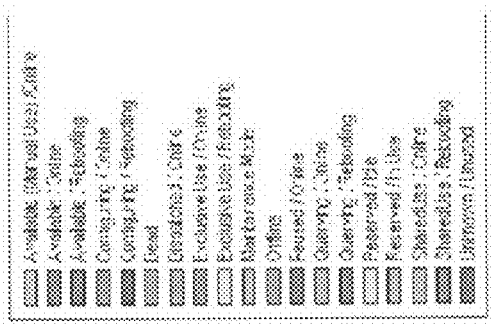
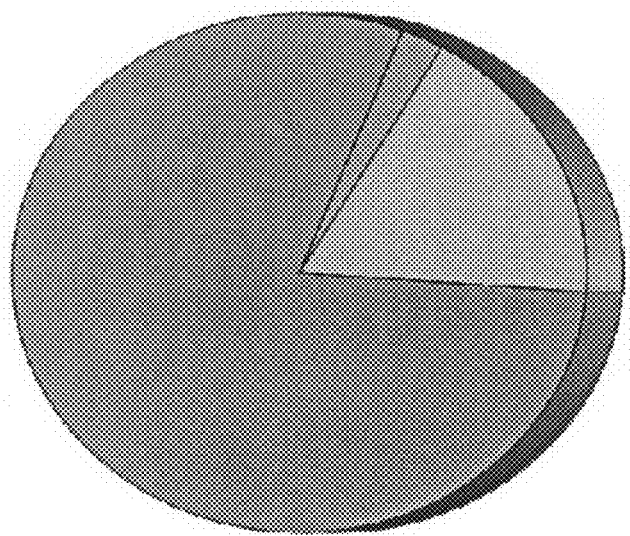
FIG. 4

DETECTING MACHINE UTILIZATION ACTIVITY

BACKGROUND

Detecting machine utilization activity is a process for tracking computer activity for one or more computers in a computer network. In some situations, computers used in a lab environment, for example, a bank of compilers may be used for a variety of activities, for example, running tests, debugging code, installing computer applications, diagnostics and the like. While computers are involved in activities, the computers' capacity to engage in additional activities is diminished. Conventional systems fail to detect machine utilization activity accurately because a computer may be engaged in an activity, but the conventional system may not perceive the activity as computer usage. Accordingly, computers in the lab environment may be under utilized or over utilized because machine utilization activity is not monitored.

In view of the foregoing, methods and systems for detecting machine utilization activity more optimally are provided. Furthermore, there is need for detecting machine utilization activity that automatically monitors computer activity in a lab environment to determine if a computer within the lab environment is available to perform an activity. It is with respect to these and other considerations that the present invention has been made.

SUMMARY

Detecting machine utilization activity may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Detecting machine utilization activity may be provided. Client machine activity within a computer network may be monitored to determine if the client machine is available for use, or if the computer is already engaged in one or more activities. During a periodic receive period, machine activity information for a given client machine is sent to a server within the computer network. The machine activity information for the client machine is compared to previously stored machine activity information to determine if an activity state for the client machine has changed. If the activity state of the client machine has changed, the activity state for the machine is updated. Machine activity information for all computers in the computer network may be used to track and optimize resources within the computer network.

In accordance with one embodiment, a method is provided for detecting machine utilization activity in a computer network. The method receives machine activity information from each client machine in the computer network. The method compares the received machine activity information from a client machine with previously stored machine activity information for the client machine to determine if a machine state for the client machine has changed. The method updates the machine activity information for the client machine if the machine state has changed. The method also provides the machine activity information for each client machine in the computer network to optimize the computer network.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings:

FIG. 2 is a chart illustrating client machine activity states;

FIG. 4 is a chart illustrating a report of client machine activity for a client machine in the networked operating environment of FIG. 1.

DETAILED DESCRIPTION

Figure 1:
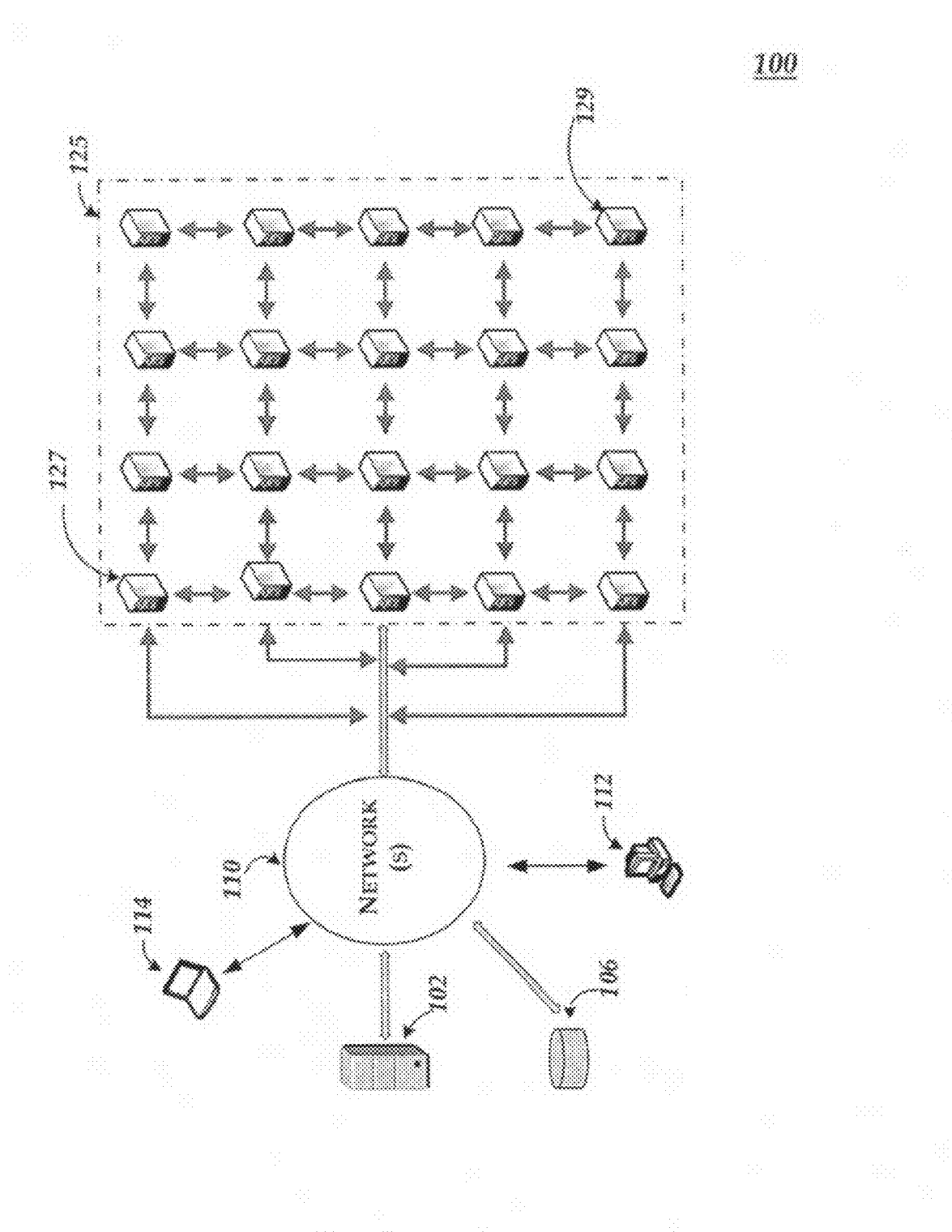
FIG. 1 illustrates a networked operating environment where embodiments may be practiced.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Detecting machine utilization activity may be provided. Consistent with embodiments of the present invention, a method and system for detecting machine utilization activity is disclosed. Often client machines in a lab environment are used for a variety of activities. However, monitoring client machine activity may not accurately reflect machine utilization, which may cause the client machine to be under utilized or over utilized. Accordingly, detecting machine activity for a client machine in a computer network may be utilized to track and optimize client machine utilization by determining if a client machine is available for a completing a tasks, or if the client machine is currently involved in performing of a task. Because client machine activity monitoring is expanded to account for a plurality client machine activities, a lab engineer may receive activity information for a client machine that more accurately reflects the client machine's actual usage. The lab engineer may use the activity information to optimize performance for a computer lab, for example, the lab engineer may use a periodic message sent from a client machine to a server to optimize performance of the computer lab. The frequency of the periodic message may be set to set to strike a balance between granularity and performance. Accordingly, an embodiment of the invention may provide a user with a method for detecting machine utilization activity in a computer network.

An embodiment consistent with the invention may include a system for detecting machine utilization activity. The system may comprise a memory storage and a processing unit coupled to the memory storage. The processing unit may be operative to receive machine activity information from one or more client machines. Upon receipt of the machine activity information, the system may also compare the received machine activity information with previously stored machine activity information to determine if a machine state change has occurred. The system may update the previously stored machine state information upon detecting a machine state change. The system may allow all machine activity information to be used to optimize computer network operations.

Referring to FIG. 1, a networked system 100 is illustrated where example embodiments may be implemented. Networked system 100 may include a computer network 110, a server 102 which manages a database 106, a desktop computer 112, a laptop computer 114, and a computer lab 125 that includes one or more client machines, for example, client machine 127 and client machine 129.

Networked system 100 may transmit and receive data to and from other computing devices such as the server 102, the desktop computer 112, the laptop computer 114, and the computer lab 125 using the computer network 110. Furthermore, networked system 100 may transmit or receive data to a storage system 106, which is managed by server 102 using the computer network 110. Other computing devices may also participate in the networked system 100. The computer network 110 may include a secure network such as an enterprise network, or an unsecure network such as a wireless open network. By way of example, and not limitation, the computer network 110 may include wired media such as a wired network or direct-wired connection, and wireless media such as acoustic, RF, infrared and other wireless media.

FIG. 2 is a chart 200 illustrating client machine activity states consistent with an embodiment of the invention for detecting machine utilization activity using a computing device of FIG. 1. The chart 200 may include states that associated with three state categories. For example, a state category may include states that are associated with a client machine running tests or software (busy state). Another state category may include states that are associated with network connectivity. Another state category may include states that are related to keyboard and mouse activity. For example, a client machine may enter a dead state, which is associated with a network connectivity state category. When a client machine is "dead", the client machine is unavailable for activity. A client machine may enter an "available/online" state in which the client machine is free and available to perform a task. A client machine may enter an available (manual use)/online" state when the client machine is not performing a tasks associated with states that are associated with a client running tests or software, but the client machine is currently being used manually, i.e., the client machine is being used by an individual.

Figure 3:
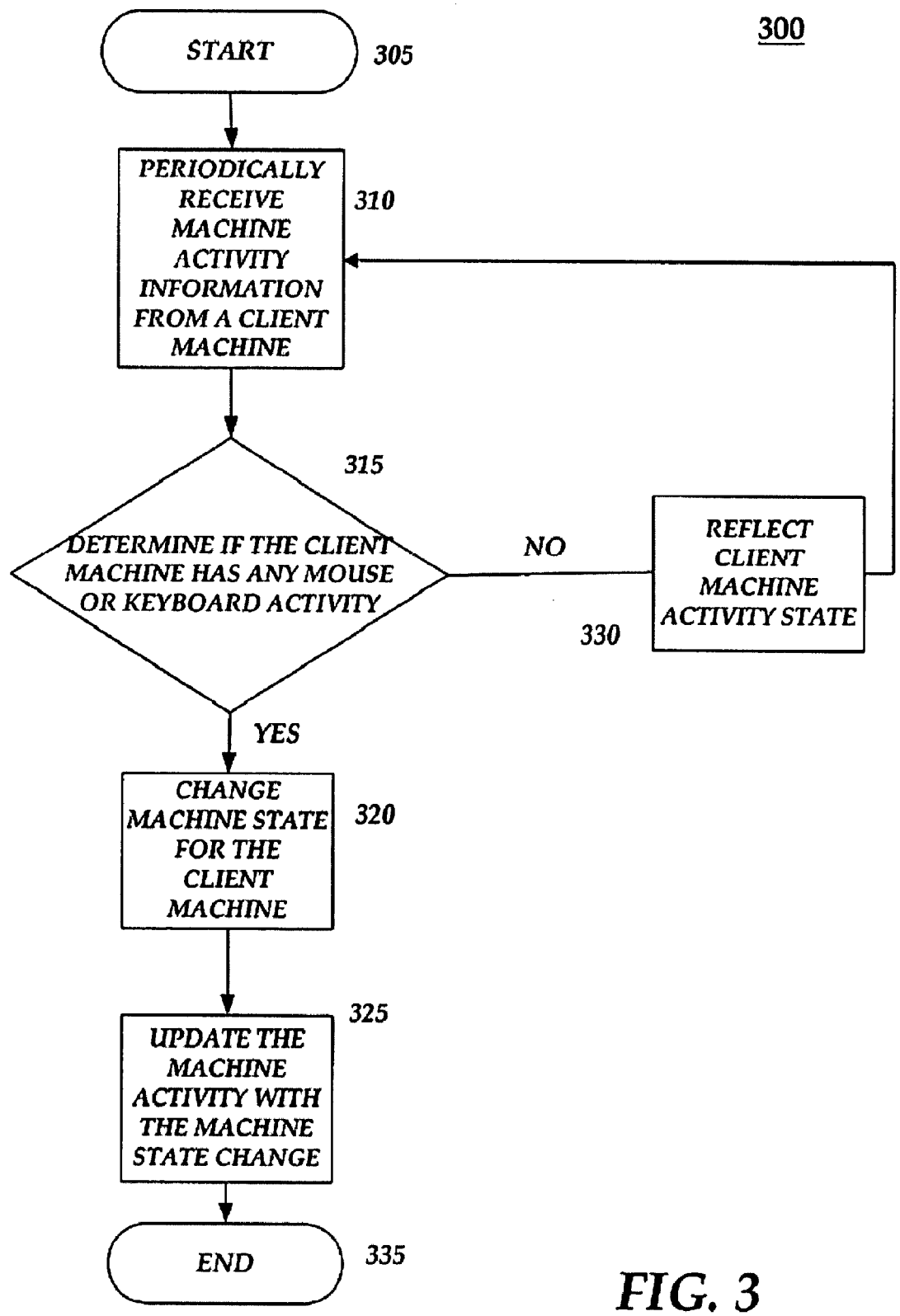
FIG. 3 is a flow chart illustrating a method for detecting machine utilization activity.

FIG. 3 is a flow chart setting forth the general stages involved in a method 300 consistent with an embodiment of the invention for detecting machine utilization activity, according to one embodiment. Ways to implement the stages of method 300 will be described in greater detail below. The method 300 starts at stage 305, and proceeds to stage 310, where the server 102 receives machine activity information, which is embedded in a periodic "alive message", from each client machine in the computer lab 125. The periodic "alive message" is a message sent by each client machine in the lab 125 to the server 102 to inform the server 102 that the client machine is connected to the network 110 and running. Machine activity information may include mouse end keyboard activity information, or the like.

Next, at stage 315, the server 102 determines if the any activity has occurred on the client machine by ascertaining if any mouse or keyboard activity has occurred since a previous "alive message." If no mouse or keyboard activity has occurred since a previous "alive message", the method 300 proceeds to stage 330, where server 102 changes a client machine activity state to reflect an activity being conducted by the client machine. If mouse or keyboard activity has occurred since a previous "alive message", the method 300 proceeds to stage 320, where the server 102 changes a client machine activity state to available (manual use)/online to reflect the mouse or keyboard activity on the client machine, (see FIG. 2).

Next, at stage 325, the server 102 updates stored machine associated with a previous "alive message" to reflect the new client machine activity state. At stage 335, the method 300 ends.

FIG. 4 is a chart illustrating a report 400 of client machine activity for a client machine in the networked operating environment of FIG. 1. After acquiring machine activity information for one or more client machines, the server 102 may provide lab engineers with the report 400 for one or more client machines, for example, client machine 129. The report 400 may graphically display client machine activity for a predetermined time period. In addition, the report 400 may provide information regarding how long a client machine remained in a given client machine activity state. For example, the report 400 may indicate that the client machine 129 was in an available (manual use)/online state for 75 minutes, in an exclusive use/online state for 10 minutes, and in an available/online state for 335 minutes out of a 419.93 minute period. By determining additional machine activity states that are not included in the state category associated with a client machine running tests or software, for example, the available (manual use)/online state, a lab engineer may view a more accurate reflection of client machine usage for the computer lab 125. Accordingly, the lab engineer may determine that the client machine 129 is being under utilized because the client machine 129 is available for additional tasks approximately 80% of the predetermined time period. The lab engineer may utilize the report to optimize operations in the computer lab 125 by ensuring that client machine 129 is utilized more often.

Figure 5:
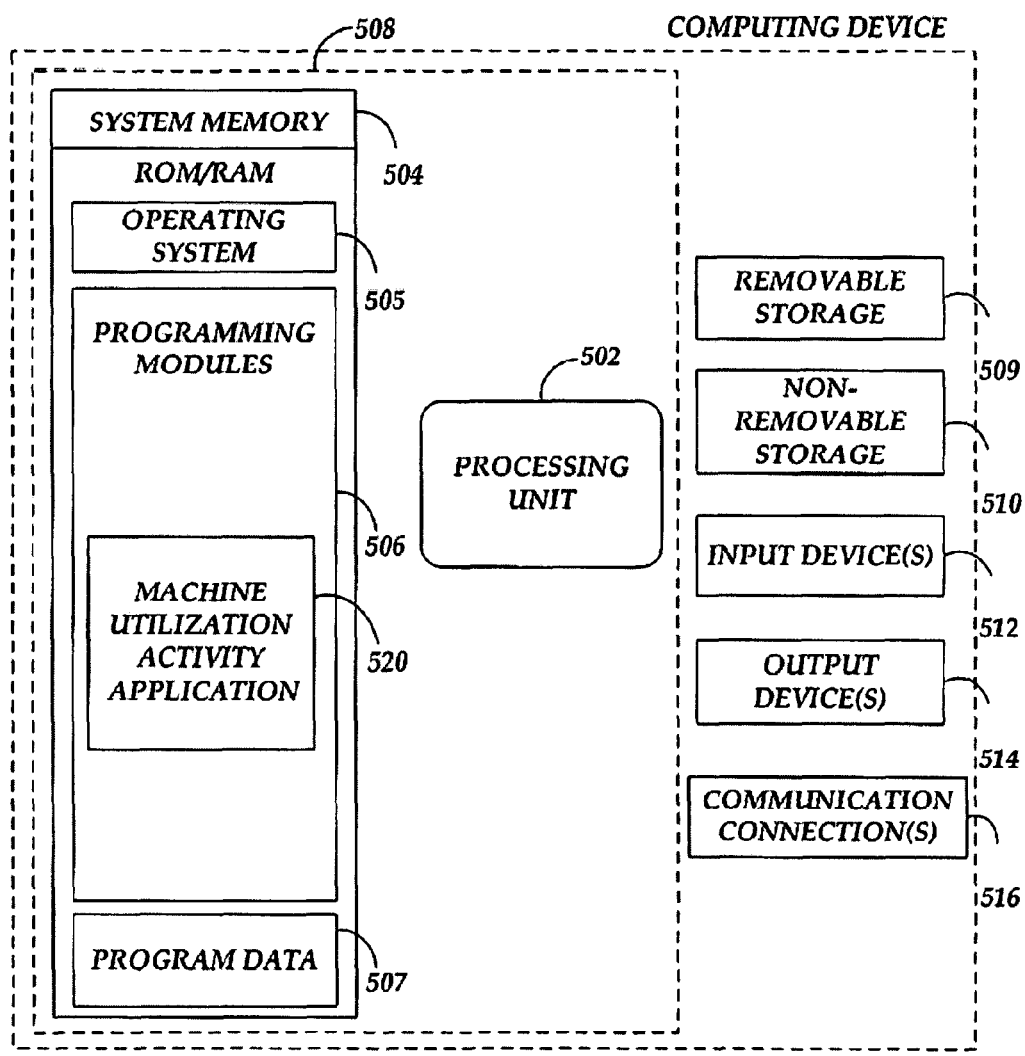
FIG. 5 is a block diagram of a system including a computing device for use in the networked operating environment of FIG. 1.

FIG. 5 is a block diagram of a system including a computing device 500, which may be used in conjunction with server 102, desktop computer 112, laptop computer 114, and computer lab 125. Consistent with an embodiment of the invention, any suitable combination of hardware, software, or firmware may be used to implement a memory storage and processing unit. For example, the memory storage and processing unit may be implemented with the computing device 500 or any of the other computing devices in combination with the computing device 500. The aforementioned system, device, and processors are examples and other systems, devices, and processors may comprise the aforementioned memory storage and processing unit, consistent with embodiments of the invention. Furthermore, the computing device 500 may comprise an operating environment for an associated system. The system may operate in other environments and is not limited to computing device 500.

With reference to FIG. 5, a system consistent with an embodiment of the invention may include a computing device, such as computing device 500. In a basic configuration, computing device 500 may include at least one processing unit 502 and a system memory 504. Depending on the configuration and type of computing device, system memory 504 may comprise, but is not limited to volatile (e.g. random access memory (RAM)), nonvolatile (e.g. read-only memory (ROM)), flash memory, or any combination. System memory 504 may include operating system 505, one or more programming modules 506, and may include a program date 507. Operating system 505, for example, may be suitable for controlling computing device 500's operation. In one embodiment, programming modules 506 may include a document creation application for creating and editing a document. Programming modules 506 may include a machine utilization activity application 520 for detecting machine utilization activity. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also employ input device(s) 512 such as a keyboard, a mouse, a pen, a sound input device, a touch input device, etc. Output device(s) 514 such as a display, speakers, a printer, etc. may else be included. The aforementioned devices are examples and others may be used.

Computing device 500 may also contain a communication connection 516 that may allow device 500 to communicate with other computing devices, such as over network 110 in a distributed computing environment for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF) infrared, and other wireless media. The term computer readable media as used herein may include both storage media end communication media.

As stated above, a number of program modules and data files may be stored in system memory 504, including operating system 505. While executing on processing unit 502, programming modules 506 may perform processes including, for example, one or more method stages as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Consistent with embodiments of the present invention, machine activity defection is used to optimize lab environment performance by accurately determining client machine usage. A server receives information regarding a client machine's activity in a periodic, for example, every six minutes, "alive massage". The periodic "alive message" may be varied by lab engineers to create an optimal balance between computer lab performance and data accuracy. The received information is compared to previously stored activity information for the client machine. If the client machine's activity information has changed from the previously stored activity information, the server updates the activity information. For example, the server may have activity information for a client machine indicating the client machine is available to perform tasks. However, during a six minute interval, a user utilizes the client machine to perform a simulation. Accordingly, in a subsequent "alive message", the server is notified that the client machine is being used. The server may then categorize the activity using states associated with FIG. 2 in order to accurately reflect the client machine's usage. Accordingly, upon receipt of machine utilization activity information by a lab engineer, the lab engineer may optimize a computer lab based on usage rates for each client machine in the computer lab.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including out not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the compute usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for detecting machine utilization activity by a computer comprising a hardware memory storage and a hardware processor unit coupled to the memory storage, the method comprising:
receiving machine activity information from one or more client machines, wherein the machine activity information is received in a periodic message, wherein the periodic message is varied and optimizes a balance between performance and accuracy with respect to the one or more client machines;
generating a usage report, wherein the report graphically displays the received machine activity information for a predetermined time period and wherein the report provides information regarding a length of time, out of the predetermined time period, that the one or more client machines remained in each of a plurality of client machine activity states associated with a plurality of state categories, the plurality of client machine activity states comprising an available (manual use)/online state, an exclusive use/online state, and an available/online state, wherein the length of time the one or more client machines remained in the available (manual use)/online state is greater than the length of time the one or more client machines remained in the exclusive use/online state and less than the length of time the one or more client machines remained in the available/online state, wherein the available (manual use)/online state comprises a state in which machine activity associated with at least one of a keyboard and a mouse has occurred on the or more client machines during the predetermined time period, wherein the exclusive use/online state comprises a busy state in which the one or more client machines is at least one of running tests or software, wherein the available/online state comprises a state in which the one or more client machines is free and available to perform a task, wherein the available/online state and the exclusive use/online state are utilized to determine a utilization percentage, the utilization percentage comprising a majority of the predetermined time period that the one or more client machines is available for additional tasks, the utilization percentage comprising about eighty percent of the predetermined time period, the predetermined time period comprising less than one day, wherein the report facilitates optimizing operations which ensure that the one or more client machines are used more often to perform the additional tasks;
comparing the received machine activity information from the one or more client machines with stored machine activity information for the one or more client machines; and
updating the stored machine activity information when the received machine activity information and the stored machine activity information are different.

2. The method of claim 1, wherein the one or more client machines are available for usage when the machine activity information does not indicate activity from the keyboard and the mouse.

3. The method of claim 1, wherein a server receives the machine activity information from the one or more client machines.

4. The method of claim 1 further comprising tracking a utilization rate for the one or more client machines.

5. A system for detecting machine utilization activity, the system comprising:
a hardware memory storage for storing machine utilization activity information and machine activity information, wherein the memory storage is searchable;
a hardware processing unit coupled to the memory storage, wherein the processing unit is operative to:
receive machine activity information from one or more client machines, wherein the machine activity information is received in a periodic message, wherein the periodic message is varied and optimizes a balance between performance and accuracy with respect to the one or more client machines;

generate a usage report, wherein the report graphically displays the received machine activity information for a predetermined time period and wherein the report provides information regarding a length of time, out of the predetermined time period, that the one or more client machines remained in each of a plurality of client machine activity states associated with a plurality of state categories, the plurality of client machine activity states comprising an available (manual use)/online state, an exclusive use/online state, and an available/online state, wherein the length of time the one or more client machines remained in the available (manual use)/online state is greater than the length of time the one or more client machines remained in the exclusive use/online state and less than the length of time the one or more client machines remained in the available/online state, wherein the available (manual use)/online state comprises a state in which machine activity associated with at least one of a keyboard and a mouse has occurred on the one or more client machines during the predetermined time period, wherein the exclusive use/online state comprises a busy state in which the one or more client machines is at least one of running tests or software, wherein the available/online state comprises a state in which the one or more client machines is free and available to perform a task, wherein the available/online state and the exclusive use/online state are utilized to determine a utilization percentage that the one or more client machines is available for additional tasks, the utilization percentage comprising about eighty percent of the predetermined time period, the predetermined time period comprising less than one day, wherein the report facilitates optimizing operations which ensure that the one or more client machines are used more often to perform the additional tasks;

compare the received machine activity information from the one or more client machines with stored machine activity information for the one or more client machines; and update the stored machine activity information when the received machine activity information and the stored machine activity information are different.

6. The system of claim 5, wherein client software is used to send machine activity information for the one or more client machines to a server.

7. The system of claim 6, wherein client software is used to determine a machine activity state for each client machine.

8. The system of claim 5, wherein controller software is used to receive machine activity information at a server.

9. The system of claim 8, wherein controller software is used to determine a machine activity state for each client machine.

10. A memory device which stores a computer program of instructions which when executed by a hardware processing unit, performs a method for detecting machine utilization activity, the method comprising:

determining whether one or more client machines are in use by a server, wherein the determination occurs during a predetermined time period;

determining a machine activity state for the one or more client machines during the predetermined time period, wherein the machine activity state is determined based on machine activity information received from the one or more client machines, wherein the machine activity information is received in a periodic message, wherein the periodic message is varied and optimizes a balance between performance and accuracy with respect to the one or more client machines;

generating a usage report, wherein the report graphically displays the received machine activity information for a predetermined time period and wherein the report provides information regarding a length of time, out of the predetermined time period, that the one or more client machines remained in each of a plurality of client machine activity states associated with a plurality of state categories, the plurality of client machine activity states comprising an available (manual use)/online state, an exclusive use/online state, and an available/online state, wherein the length of time the one or more client machines remained in the available (manual use)/online state is greater than the length of time the one or more client machines remained in the exclusive use/online state and less than the length of time the one or more client machines remained in the available/online state, wherein the available (manual use)/online state comprises a state in which machine activity associated with at least one of a keyboard and a mouse has occurred on the or more client machines during the predetermined time period, wherein the exclusive use/online state comprises a busy state in which the one or more client machines is at least one of running tests or software, wherein the available/online state comprises a state in which the one or more client machines is free and available to perform a task, wherein the available/online state and the exclusive use/online state are utilized to determine a utilization percentage, the utilization percentage comprising a majority of the predetermined time period that the one or more client machines is available for additional tasks, the utilization percentage comprising about eighty percent of the predetermined time period, the predetermined time period comprising less than one day, wherein the report facilitates optimizing operations which ensure that the one or more client machines are used more often to perform the additional tasks;

comparing the received machine activity state from the one or more client machines with a stored machine activity state for the one or more client machines at the server; and updating the stored machine activity state when the received machine activity state and the stored machine activity state are different.

11. The memory device of claim 10, further comprising tracking a utilization rate for the one or more client machines.

* * * * *